US007731121B2

(12) United States Patent
Smith et al.

(10) Patent No.: US 7,731,121 B2
(45) Date of Patent: Jun. 8, 2010

(54) PROPULSIVE ANTI-TORQUE SYSTEM FOR ROTORCRAFT

(75) Inventors: Dudley E. Smith, Arlington, TX (US); Walter C. Joiner, Arlington, TX (US); Paul J. Madej, Grand Prairie, TX (US); Charles L. Hollimon, North Richland Hills, TX (US); Daniel B. Robertson, Southlake, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 390 days.

(21) Appl. No.: 11/662,559

(22) PCT Filed: Sep. 28, 2004

(86) PCT No.: PCT/US2004/031752

§ 371 (c)(1), (2), (4) Date: Mar. 12, 2007

(87) PCT Pub. No.: WO2006/036147

PCT Pub. Date: Apr. 6, 2006

(65) Prior Publication Data

US 2008/0093500 A1 Apr. 24, 2008

(51) Int. Cl.
*B64C 27/82* (2006.01)

(52) U.S. Cl. ................................. 244/17.19; 244/23 D

(58) Field of Classification Search ............. 244/17.11, 244/23 D, 21, 17.19

See application file for complete search history.

(56) References Cited

U.S. PATENT DOCUMENTS 2,420,784 A 5/1947 Larsen
2,481,749 A 9/1949 Hiller, Jr.
2,518,697 A * 8/1950 Lee ......................... 244/17.19
3,351,304 A * 11/1967 Stein et al. ............... 244/17.19
3,807,662 A * 4/1974 Velazquez ................ 244/17.19
3,957,226 A 5/1976 Daggett, Jr. et al.
4,200,252 A 4/1980 Logan et al.
D291,194 S 8/1987 Binden
4,711,415 A * 12/1987 Binden .................... 244/17.19
D297,005 S 8/1988 Whyte
4,948,068 A * 8/1990 VanHorn ................. 244/17.19
5,232,183 A * 8/1993 Rumberger .............. 244/17.19
5,727,757 A * 3/1998 Nyhus ........................ 244/221
6,352,220 B1 * 3/2002 Banks et al. ............. 244/17.19

FOREIGN PATENT DOCUMENTS

GB 2238996 A 6/1991

* cited by examiner

*Primary Examiner*—Tien Dinh
(74) *Attorney, Agent, or Firm*—James E. Walton

(57) ABSTRACT

A rotorcraft having an enhanced configuration in which a simple wing and a propulsive anti-torque system are combined is disclosed. The propulsive anti-torque system includes an anti-torque thruster system in which a variable pitch fan is installed internal to the tail boom of the rotorcraft and an anti-torque thruster nozzle is mounted at the extremity of the tail boom. The fan is driven directly from the main rotor drive. The configuration and location of the fan allows the primary exhaust from the engine to be mixed with the compressed air flow from the fan. The mixed air flow from the fan and the engine passes through the tail boom and out the thruster nozzle.

15 Claims, 5 Drawing Sheets

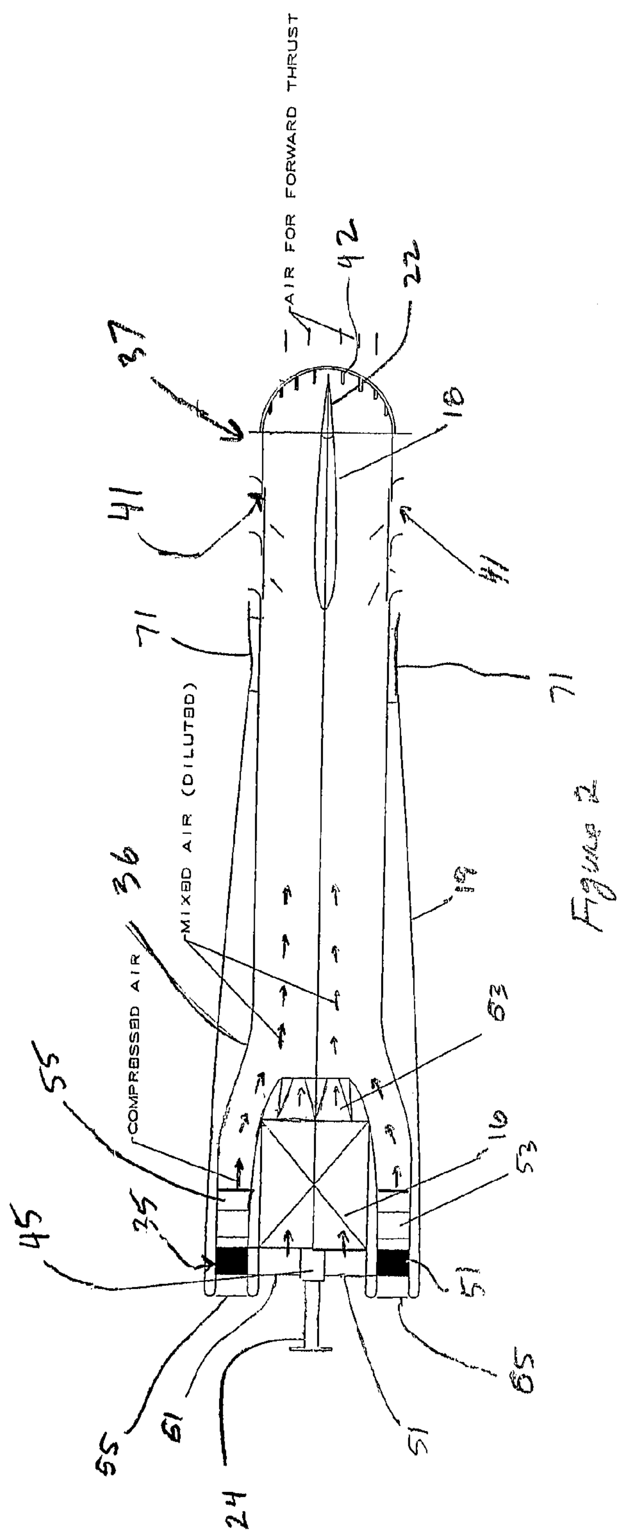
Figure 2
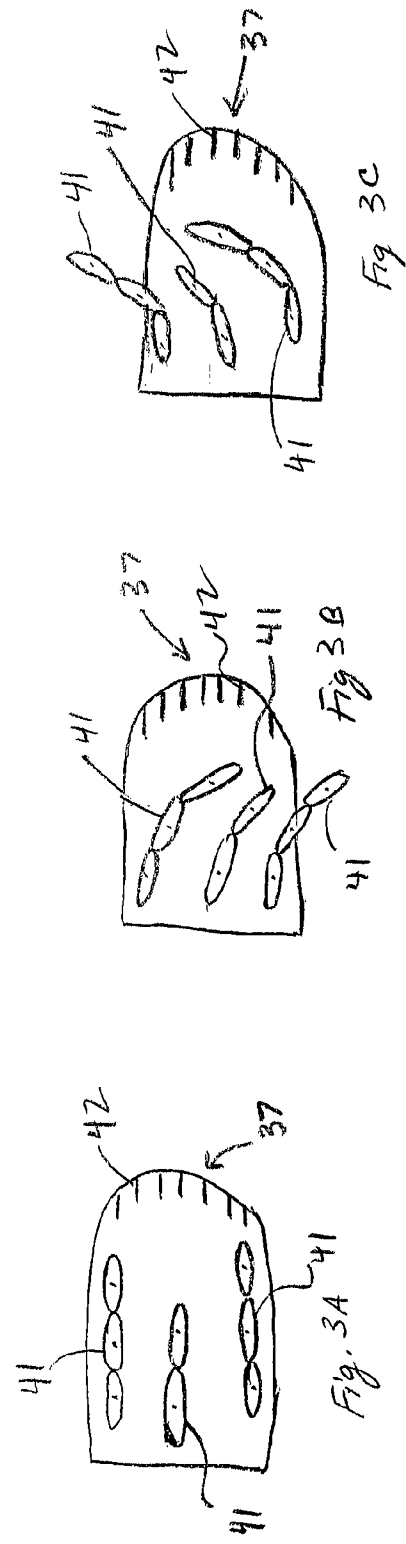
Fig 3C
Fig 3B
Fig. 3A 111
122
120
118
141
141
141
137
129
171
171
119
128
121
131b
131a
113
117
127
115

PROPULSIVE ANTI-TORQUE SYSTEM FOR ROTORCRAFT

TECHNICAL FIELD

The present invention relates to rotorcraft. In particular, the present invention relates to propulsive anti-torque systems for rotorcraft.

DESCRIPTION OF THE PRIOR ART

To make a meaningful improvement in the productivity of conventional helicopters, an increase in the cruising speed of about 30% is required, and the improvement must be achieved within certain noise and ride quality constraints. Historically, improvements in helicopter productivity have been, at best, only incremental. The primary reason for this is the classical helicopter configuration. With the classical helicopter configuration, there are certain fundamental limitations that hamper improvements in productivity, including: retreating blade stall, blade loading, advancing blade tip Mach number, and the large increases in power that are required with increased speed. These physical limitations contribute to increased vibration, with its resulting poor ride quality and reduced component life. In addition, these physical limitations lead to increased size, which increases the ultimate cost of the helicopter due to the synergistic growth of the configuration when the helicopter is designed to address these limitations.

The classical approach to this problem is to develop compound helicopters in which these configuration limitations are addressed via ancillary devices, such as wings, additional engines, and propellers. Incorporation of these approaches, due to their increased complexity and weight, reduces the economic load carrying capability of the helicopter and raises questions as to the safety of operation of the helicopter and its long term reliability.

Although the development of compound helicopters with wings, additional engines, and propellers represents significant improvements in helicopter productivity, considerable shortcomings remain.

SUMMARY OF THE INVENTION

Therefore, it is an object of the present invention to provide a rotorcraft having a propulsive anti-torque system that improves the productivity of the rotorcraft while addressing the limitations of the classical helicopter configuration.

It is another object of the present invention to provide a rotorcraft in which lift compounding is combined with propulsion compounding.

These objects are achieved by providing a rotorcraft having an enhanced helicopter configuration in which a simple wing and a propulsive anti-torque system are combined. The propulsive anti-torque system includes an anti-torque thruster system in which a variable pitch fan is installed internal to the tail boom of the rotorcraft and an anti-torque thruster nozzle is mounted at the extremity of the tail boom. The fan is driven directly from the main rotor drive via a short shaft. The configuration and location of the fan allows the primary exhaust from the engine to be mixed with the air flow from the fan. The mixed air flow from the fan and the engine passes through the tail boom and out the thruster nozzle. All embodiments of the rotorcraft of the present invention may be configured for either manned or unmanned operation.

The present invention provides significant advantages, including: (1) the cruising speed of the rotorcraft can be increased by 30-40 knots; (2) blade loading and flapping are significantly reduced; (3) the margins for hub and control loads are improved; (4) the quality of the ride at high speeds is significantly improved; (5) the noise level in hover and overflight is significantly reduced; and (6) system complexity is greatly reduced; (7) the infrared (IR) signature of the rotorcraft is significantly reduced, because the primary engine exhaust is highly diluted when mixed with the air flow from the fan; (8) the acoustic signature of the rotorcraft is greatly reduced, because both the primary engine and the propulsive anti-torque system are internal to the tail boom of the rotorcraft; (9) the rotorcraft is significantly safer for personnel during ground operations, because both the primary engine and the propulsive anti-torque system are internal to the tail boom of the vehicle, thereby eliminating the possibilities of exposure to hot exhaust gasses or tail rotor strikes; (10) anti-torque thrust is provided without the cost, weight, and complexity of a tail-rotor type device or a thrust type device that uses a fan driven by a secondary drive system; and (11).

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

FIG. 2 is a top-view schematic of the propulsive anti-torque system of the rotorcraft of FIGS. 1A and 1B;

FIGS. 3A-3C are schematic views of the thrust nozzle of the propulsive anti-torque system of FIG. 2;

DESCRIPTION OF THE PREFERRED EMBODIMENT

The present invention represents a unique combination of lift compounding and propulsion compounding to create a small rotorcraft that can travel at very high speeds. The lift compounding is provided by a small wing, and the propulsion compounding is provided by a pneumatic propulsive anti-torque system. Although the present invention will be described herein with respect to helicopters, it will be appreciated that the present invention may be utilized on a wide variety of rotorcraft.

Figure 1A:
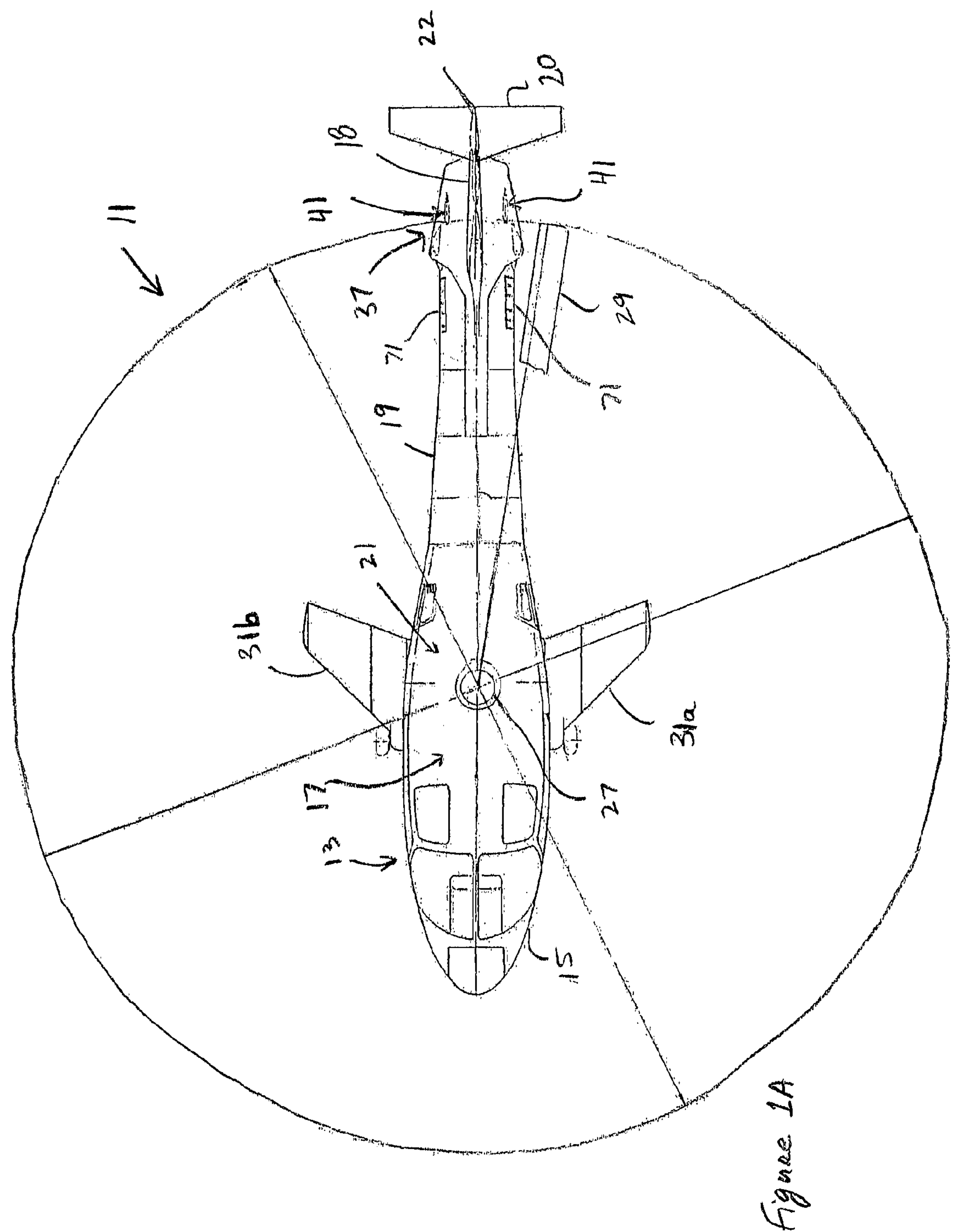
FIG. 1A is a top view of a rotorcraft having a propulsive anti-torque system according to the present invention.
Figure 1B:
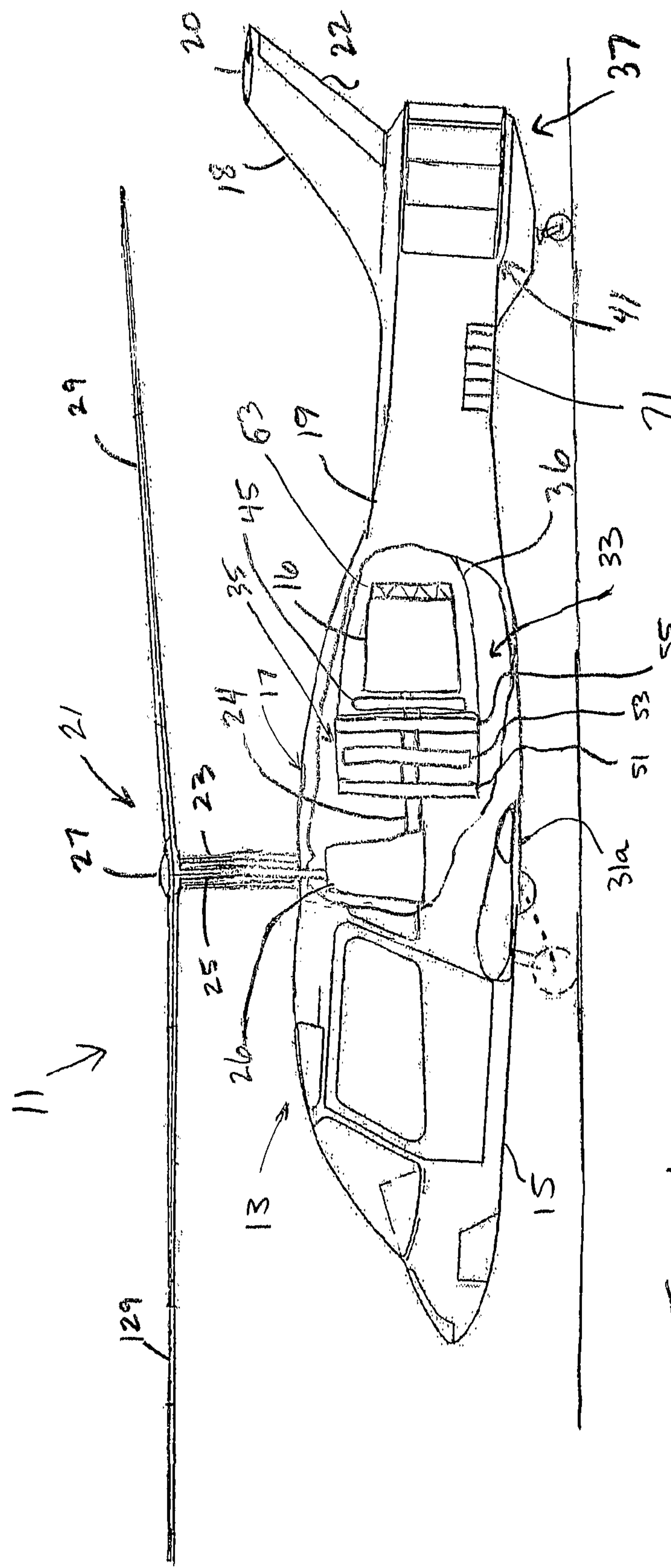
FIG. 1B is a cut-away side view of the rotorcraft of FIG. 1A.

Referring to FIGS. 1A and 1B in the drawings, the preferred embodiment of a helicopter 11 according to the present invention is illustrated. FIG. 1A is top view of helicopter 11, and FIG. 1B is a cut-away side view of helicopter 11. Helicopter 11 includes an airframe 13 having a cabin portion 15, an upper canopy 17, a tail boom 19, a vertical tail fin 18, a horizontal stabilizer 20, and a controllable rudder 22. Helicopter 11 is powered by a primary turboshaft engine 16 carried within tail boom 19. Engine 16 provides torque to a main rotor system 21 via a drive shaft 24 and a gearbox 26. Main rotor system 21 includes a rotating control system 23, a main rotor shaft 25, a rotor hub 27, and rotor blades 29.

Helicopter 11 includes a means for lift compounding and a separate means for propulsion compounding. In the preferred embodiment, the lift compounding is provided by small wings 31*a* and 31*b* disposed on each side of airframe 13 at about the longitudinal midpoint of cabin portion 15. Although wings 31*a* and 31*b* are shown as aft swept wings, it will be appreciated that wings 31*a* and 31*b* may be of a wide variety of shapes, sizes, and configurations, depending upon the performance characteristics desired. The propulsion compounding is provided by a propulsive anti-torque system 33 carried primarily within tailboom 19.

Propulsive anti-torque system 33 is preferably a pneumatic anti-torque thruster system having a fan module 35 carried internal to tail boom 19, and an anti-torque thrust nozzle 37 disposed at the aft end of tail boom 19. In the preferred embodiment, fan module 35 is conjoined with engine 16, such that fan module 35 and gearbox 26 are both driven by drive shaft 24. Fan module 35 is located forward of engine 16 in tail boom 19, and fan module 35 and engine 16 are disposed within an internal duct system 36 that extends along the length of tail boom 19. Thrust nozzle 37 includes a plurality of articulating control vanes 41 and may include vertical fins 42. The positioning of control vanes 41 is controlled by a computer and electric or hydraulic actuators, with software located either in the helicopter flight control computer or the engine control computer.

Fan module 35 preferably includes inlet guide vanes 51, a rotor disk 53, and a stator 55. In the preferred embodiment, rotor disk 53 rotates, and inlet guide vanes 51 and stator 55 do not rotate; however, the blades of inlet guide vanes 51, rotor disk 53, and stator 55 may be variable-pitch blades. It will be appreciated that inlet guide vanes 51, rotor disk 53, and stator 55 may be combined a wide variety of configurations of rotating and non-rotating disks, and variable-pitch and fixed blades, depending upon the performance characteristics desired.

In order to control and maintain a relatively low temperature within duct system 36 and tail boom 19, a plurality of spillage doors 71 are provided near the aft end of tail boom 19. Spillage doors 71 vent excess air flow in duct system 36 to the atmosphere to maintain a selected internal temperature within duct system 36. Spillage doors 71 are located on both sides of tail boom 19 and operate in tandem. This ensures that any forces generated air flowing through spillage doors 71 is balanced. However, it will be appreciated that spillage doors may be operated in a manner that produces a net lateral thrust. This is particularly useful as a supplement to the anti-torque and yaw control functions of thrust nozzle 37.

Referring now additionally to FIG. 2 in the drawings, the unique configuration and operation of helicopter 11 will be explained. Anti-torque thrust and aft facing propulsive thrust are provided by a directed, mixed, compressed airflow. This mixed, compressed airflow results from the unique conjoined configuration of fan module 35 and engine 16. As explained above, fan module 35 is driven by the same engine power turbine shaft that supplies power to gearbox 26 for main rotor assembly 21. As such, no secondary drive system for fan module 35 is required. This eliminates the need for independent shafting for an isolated fan, thereby reducing part count, complexity, and weight. For manned versions of helicopter 11, an overrunning/freewheeling clutch 45 can be included in the drive train of fan 35 to allow anti-torque thrust to be provided during autorotation if engine 16 is shut down in flight. For unmanned vehicles, clutch 45 may be omitted to further reduce complexity, cost, and weight.

In operation, air enters engine 16 at engine air inlets 61 and exits through an engine exhaust nozzle 63. At the same time, air enters fan air inlets 65 and is directed around engine 16 by duct system 36. The compressed air from fan module 35 is mixed with the engine exhaust within duct system 36. Engine exhaust nozzle 63 is preferable a daisy-type nozzle that provides shear layers for disrupting the flow of exhaust from engine 16 and facilitating the mixing of the compressed air flow from fan module 35 with the exhaust flow from engine 16. It should be noted that the exhaust from engine 16 is not propulsive in an of itself. The propulsive force is generated by fan module 35.

The mixed flow follows along duct system 36 to the end of tail boom 19, where it is exits through thrust nozzle 37. The mixing of the fan flow with the primary engine exhaust flow results in a highly diluted vehicle exhaust flow, thereby providing significant reductions in the IR signature of the vehicle. This eliminates the cost, weight, and complexity of conventional engine exhaust IR suppressor devices. In addition, propulsive anti-torque system 33 provides significant reductions in the acoustic signature of the vehicle, as both primary engine 16 and anti-torque propulsive system 33 are internal to tail boom 19 of helicopter 11.

In the preferred embodiment, propulsive anti-torque system 33 is operated and controlled by the flight control computers of helicopter 11. Propulsive anti-torque system 33 is capable of performing many different functions, including: (1) providing anti-torque thrust; (2) providing left and right thrust for yaw control; (3) providing forward thrust; (4) reducing the infrared (IR) signature of helicopter 11 by mixing cold fan air with hot exhaust from engine 16; (5) reducing the acoustic signature of helicopter 11 by locating engine 16 and fan module 35 within tail boom 16; and (6) providing pitch and attitude control.

Referring now to FIGS. 3A-3C in the drawings, the operation of control vanes 41 is illustrated schematically in three top views. In FIG. 3A, control vanes 41 are aligned longitudinally in a forward thrust mode. In FIG. 3B, control vanes are articulated to the left in a left-thrust mode. In FIG. 3C, control vanes 41 are articulated to the right in a right-thrust mode. Control vanes 41 articulate in unison and work together to selectively direct the flow of mixed air out of duct system 36. Each individual control vane 41 pivots on a generally vertical axis and is pivotally connected to an adjacent control vane 41. This allows maximum movement of each set of control vanes 41.

In operation, the mixed airflow from fan module 35 enters control vanes 41 at a forward end having a selected flow area. When it is necessary or desired to have anti-torque thrust or yaw control lateral thrust, control vanes 41 are moved by their corresponding actuators into the required position. In the preferred embodiment, as control vanes are moved into the left- and right-thrust modes, the exit area is reduced. This increases the thrust force produced by thrust nozzle 37.

It will be appreciated that thrust nozzle 37 may be configured in a wide variety of ways without departing from the spirit of the present invention. For example, thrust nozzle 37 may include generally horizontally pivoting control vanes that allow for vertical redirection of the thrust. Such horizontal control vanes allow thrust nozzle 37 to be used for pitch and attitude control. In addition, although control vanes 41 have been shown as having an airfoil shaped vertical cross-section, it should be understood that control vanes 41 may be formed in wide variety of shapes, including curved, concave, convex, and combinations of different shapes.

Furthermore, thrust nozzle 37 may be configured as a scoop shaped nozzle that rotates about the longitudinal axis of tail boom 19. This allows the air flow to be split into different flow channels and selectively directed through the scoop portion of thrust nozzle 37 by rotating the scoop portion. For example, duct system 36 may be divided into several longitudinally extending sections. The entry end of thrust nozzle 37 would be divided into sections that align with the sections of the duct system. As the nozzle is rotated, the airflow from some sections are diverted into other sections of the scoop portion.

From hover to the low speed cruise regime, the yaw of helicopter 11 may be precisely controlled by varying the pitch of the blades of fan module 35 and adjusting the angles of control vanes 41. Above a specific design speed, i.e., approximately 100 knots, vertical tail fin 18 and controllable rudder 22 eliminate the need for the propulsive yaw trim and control. When anti-torque thrust is not longer required, control vanes 41 are positioned in the forward-thrust mode to allow airflow through aft fins 42, thereby providing propulsive thrust during forward flight. At that point, thruster nozzle 37 then provides additional force to accelerate helicopter 11 to the high speed cruise regime, where wings 31*a* and 31*b* unload main rotor system 21 by up to 20% of the required lift.

Main rotor system 21, which operates at relatively low tip speeds for noise considerations, is thus unloaded in both lift and propulsive force. This results in significant reductions in blade loading and flapping, and improves ride quality at high speed. The overall noise of helicopter 11 is reduced in hover and overflight due to the combination of lowered main rotor tip speed and virtual elimination of the anti-torque noise caused by tail rotors by enclosing fan module 35 within tail boom 19. The system complexity of compounds, i.e., extra shafts, gearboxes, propellers, controls, etc., is eliminated while maintaining their desired features. As a result, helicopter 11 possesses the speed, ride quality, and rotor downsizing capability of the compound with the relatively simple mechanics of an anti-torque system.

Propulsive anti-torque system 33 uses fewer and simpler parts, thereby reducing failure modes and increasing safety, while reducing cost and weight. In addition, propulsive anti-torque system 33 is significantly safer for personnel during ground operations, because both primary engine 16 and propulsive anti-torque system 33 are internal to tail boom 19 of helicopter 11, thereby eliminating the possibilities of exposure to hot exhaust gasses or tail rotor strikes.

Figure 4A:
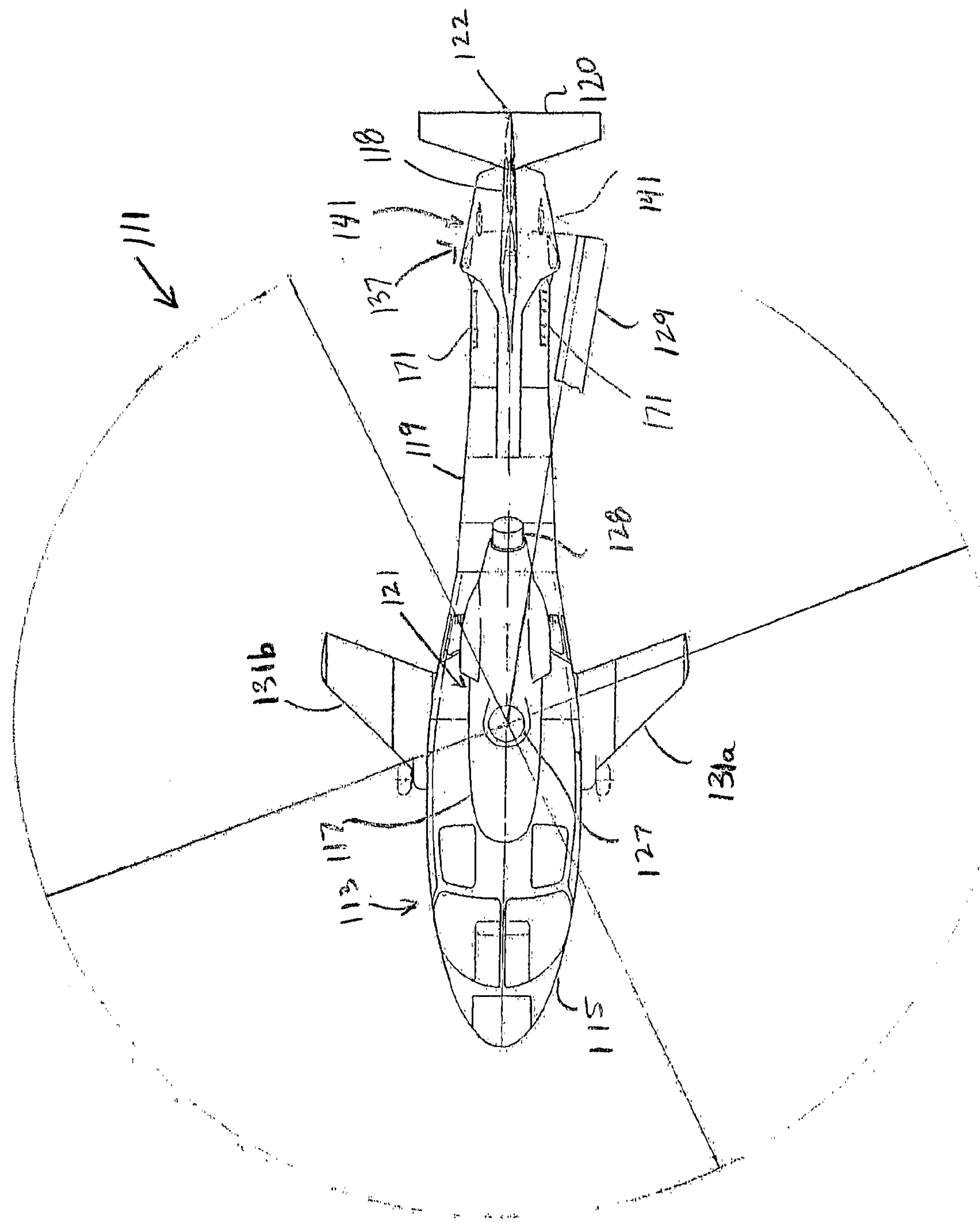
FIG. 4A is a top view of an alternate embodiment of a rotorcraft having a propulsive anti-torque system according to the present invention.
Figure 4B:
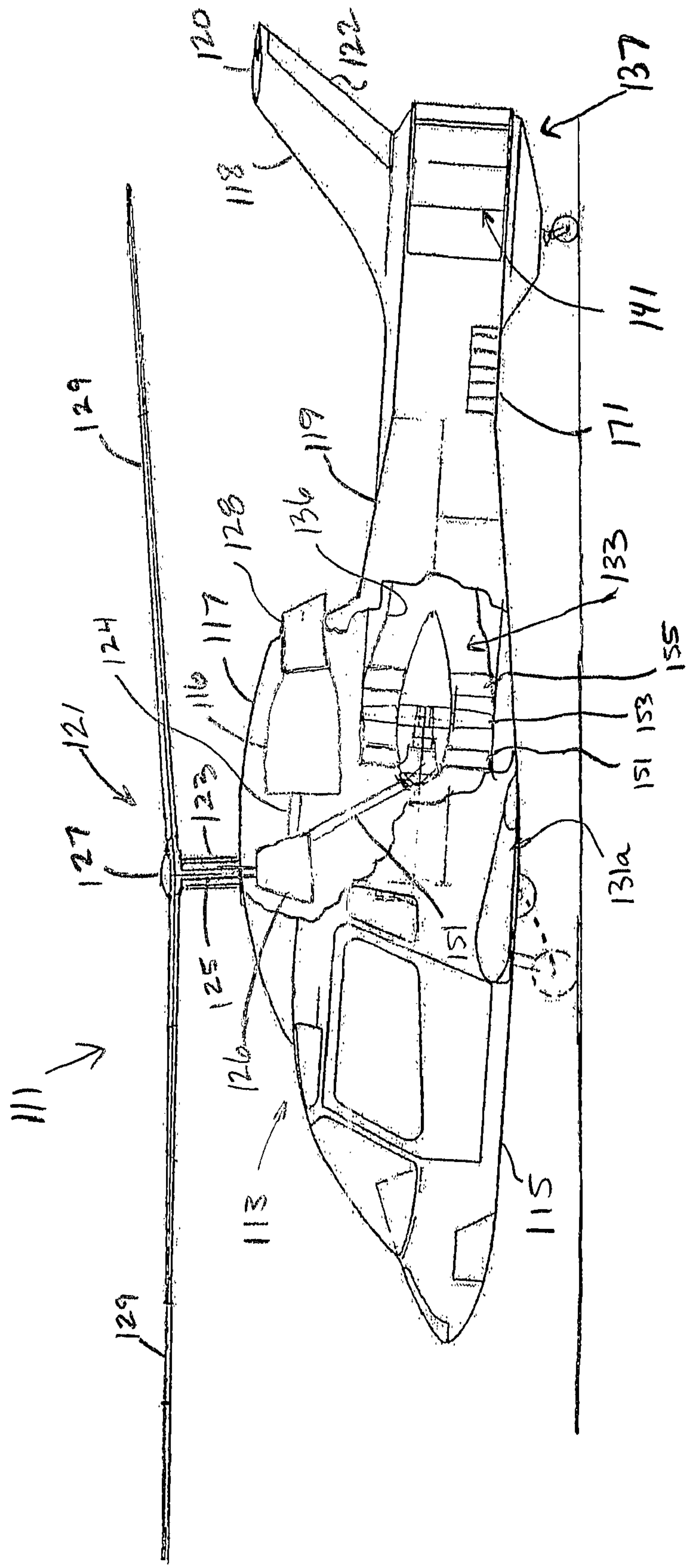
FIG. 4B is a cut-away side view of the rotorcraft of FIG. 4A.

Referring now to FIGS. 4A and 4B in the drawings, a helicopter 111 having a propulsive anti-torque system according to an alternate embodiment of the present invention is illustrated. FIG. 4A is top view of helicopter 111, and FIG. 4B is a cut-away side view of helicopter 111. Helicopter 111 includes an airframe 113 having a cabin portion 115, an engine canopy 117, a tail boom 119, a vertical tail fin 118, a horizontal stabilizer 120, and a controllable rudder 122. Helicopter 111 is powered by a primary turboshaft engine 116 carried within engine canopy 117. In this embodiment, engine 116 includes an exhaust port 128 that allows the exhaust from engine 116 to escape unmixed into the atmosphere. Engine 116 provides torque to a main rotor system 121 via a drive shaft 124 and a gearbox 126. Main rotor system 121 includes a rotating control system 123, a main rotor shaft 125, a rotor hub 127, and rotor blades 129.

As with helicopter 11, helicopter 111 includes a means for lift compounding and a separate means for propulsion compounding. In the preferred embodiment, the lift compounding is provided by small wings 131*a* and 131*b* disposed on each side of airframe 113 at about the longitudinal midpoint of cabin portion 115. Although wings 131*a* and 131*b* are shown as aft swept wings, it will be appreciated that wings 131*a* and 131*b* may be of a wide variety of shapes, sizes, and configurations, depending upon the performance characteristics desired. The propulsion compounding is provided by a propulsive anti-torque system 133 carried primarily within tail-boom 119.

Propulsive anti-torque system 133 is preferable a pneumatic anti-torque thruster system having a constant-speed fan module 135 carried internal to tail boom 119, and an anti-torque thrust nozzle 137 disposed at the aft end of tail boom 119. As with the embodiment of FIGS. 1A and 1B, fan module 135 may include inlet guide vanes 151, a rotor disk 153, and a stator 155.

Fan module 135 is identical in form and function as fan module 35. As such, fan module 135 preferably includes inlet guide vanes 151, a rotor disk 153, and a stator 155. In the preferred embodiment, rotor disk 153 rotates, and inlet guide vanes 151 and stator 155 do not rotate; however, the blades of inlet guide vanes 151, rotor disk 153, and stator 155 may be variable-pitch blades. It will be appreciated that inlet guide vanes 151, rotor disk 153, and stator 155 may be combined a wide variety of configurations of rotating and non-rotating disks, and variable-pitch and fixed blades, depending upon the performance characteristics desired.

The difference between the embodiment of FIGS. 4A and 4B and the embodiment of FIGS. 1A and 1B, is that fan module 135 is not conjoined with engine 116 and is not driven by the same drive shaft, i.e. not driven by drive shaft 124. In the embodiment of FIGS. 4A and 4B, fan module 135 is disposed below engine 116 and is driven by a second drive shaft 151 extending from gear box 126. As such, propulsive anti-torque system 133 of helicopter 111 performs all of the propulsive anti-torque functions of propulsive anti-torque system 33, with the exception that propulsive anti-torque system 133 does not have the capability of mixing the hot exhaust from engine 116 with the cold compressed air from fan module 135. Otherwise, duct system 136, thrust nozzle 137, control vanes 141, and spillage doors 171 of propulsive anti-torque system 133, function identically as duct system 36, thrust nozzle 37, control vanes 41, and spillage doors 71 of propulsive anti-torque system 33.

It will be appreciated that the embodiment of FIGS. 1A and 1B is particularly well suited for military applications, and that the embodiment of FIGS. 3A and 3B is particularly well suited for commercial applications.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A rotorcraft comprising:

a means for lift compounding; and a separate means for propulsion compounding, which is a pneumatic propulsive anti-torque system, comprising:

a tail boom disposed at the aft end of the rotorcraft;

an engine disposed in the tail boom for providing torque through a drive shaft to a rotor system of the rotorcraft;

a fan module disposed in the tail boom and driven by the drive shaft for producing a flow of compressed air through the tail boom;

a thrust nozzle disposed at the end of the tail boom for selectively producing anti-torque thrust and forward thrust;

a duct system disposed within the tail boom for directing the air flow through the tail boom to the thrust nozzle;

adjustable spillage doors disposed near the aft end of the tail boom for selectively releasing excess airflow from within the duct system and for selectively controlling a temperature within the duct system; and wherein the fan module is located in relation to the engine, such that the compressed air flow from the fan module is mixed with exhaust from the engine to cool the exhaust from the engine a plurality of control vanes disposed at the aft end of the tail boom for selectively controlling the anti-torque thrust and forward thrust, the control vanes being configured to pivot about a vertical axis as well as being pivotally connected to the control vanes located adjacently.

2. The rotorcraft according to claim 1, wherein the thrust nozzle comprises:

a plurality of stationary vertical fins located aft of the control vanes.

3. The rotorcraft according to claim 2, wherein the control vanes articulate between a left-thrust mode in which the control vanes are pivoted relative to the tail boom and to one another so as to direct the air flow from to the left of the tail boom, thereby producing left thrust; a right-thrust mode in which the control vanes are pivoted relative to the tail boom and to one another so as to direct the air flow to the right of the tail boom, thereby producing right thrust; and a forward thrust mode in which the control vanes are aligned longitudinally so as to direct the air flow out the aft end of the tail boom, thereby producing forward thrust.

4. The rotorcraft according to claim 2, wherein the control vanes are configured to produce a reduced exit area, thereby increasing the thrust generated by the fan module.

5. The rotorcraft according to claim 1, wherein the fan module has variable-pitch fan blades.

6. The rotorcraft according to claim 1, wherein the fan module comprises:

inlet guide vanes;

a rotor disk; and a stator.

7. The rotorcraft according to claim 6, wherein the inlet guide vanes are configured to not rotate, the rotor disk is configured to rotate, and the stator is configured to not rotate.

8. The rotorcraft according to claim 1, further comprising:

a freewheeling clutch disposed between the fan and the drive shaft to allow anti-torque thrust to be provided during autorotation if the engine is shut down in flight.

9. The rotorcraft according to claim 1, wherein the thrust nozzle is a scoop shaped nozzle.

10. The rotorcraft according to claim 1, further comprising:

a freewheeling clutch operably associated with the fan module to allow anti-torque thrust to be provided during autorotation if the engine is shut down in flight.

11. A rotorcraft having an engine for driving a rotor system comprising:

a plurality of wings disposed on the side of the rotorcraft to provide lift compounding; and a pneumatic propulsive anti-torque system comprising:

a tail boom disposed at the aft end of the rotorcraft;

a fan module disposed in the tail boom and driven by the engine for producing a flow of compressed air through the tail boom;

adjustable spillage doors disposed near the aft end of the tail boom for selectively releasing excess airflow from within the tail boom and for selectively controlling a temperature within the duct system; and a thrust nozzle disposed at the end of the tail boom for selectively producing anti-torque thrust and forward thrust, wherein the thrust nozzle comprises:

a plurality of articulating control vanes which pivot about an axis that is generally vertical relative to the tail boom and disposed at the aft end of the tail boom for selectively controlling the anti-torque thrust and forward thrust. wherein the control vanes articulate between a left-thrust mode in which the control vanes are pivoted relative to the tail boom and to one another so as to direct the air flow from to the left of the tail boom, thereby producing left thrust; a right-thrust mode in which the control vanes are pivoted relative to the tail boom and to one another so as to direct the air flow to the right of the tail boom, thereby producing right thrust; and a forward thrust mode in which the control vanes are aligned longitudinally so as to direct the air flow out the aft end of the tail boom, thereby producing forward thrust.

12. The rotorcraft according to claim 11, further comprising:

a freewheeling clutch operably associated with the fan to allow anti-torque thrust to be provided during autorotation if the engine is shut down in flight.

13. The rotorcraft according to claim 11, wherein the control vanes are configured to produce a reduced exit area, thereby increasing the thrust generated by the fan module.

14. A rotorcraft, comprising:

a tail boom disposed at the aft end of the rotorcraft;

an engine disposed in the tail boom for providing torque to a rotor system of the rotorcraft;

a fan module disposed in the tail boom and driven by the engine for producing a flow of compressed air through the tail boom;

a thrust nozzle disposed at the end of the tail boom for selectively producing anti-torque thrust and forward thrust; and a plurality of sets of control vanes configured so that the control vanes within each set are located adjacently in a longitudinal direction, such that adjacent control vanes within each set are pivotally connected to each other;

wherein each control vane within a set of control vanes is configured to pivot on a generally vertical axis; and wherein the fan module is located in relation to the engine, such that the compressed air flow from the fan module is mixed with exhaust from the engine to cool the exhaust from the engine.

15. The rotorcraft according to claim 14, further comprising:

a freewheeling clutch operably associated with the fan module to allow anti-torque thrust to be provided during autorotation if the engine is shut down in flight.

* * * * *